United States Patent

[11] 3,593,829

| [72] | Inventor | Winston F. Williams<br>Cedar Rapids, Iowa |
|------|----------|-------------------------------------------|
| [21] | Appl. No. | 33,420 |
| [22] | Filed | Apr. 30, 1970 |
| [45] | Patented | July 20, 1971 |
| [73] | Assignee | Collins Radio Company<br>Cedar Rapids, Iowa |

[54] MECHANICAL STOP LIMIT MEANS FOR LEAD SCREW-DRIVEN RAM
5 Claims, 3 Drawing Figs.

[52] U.S. Cl. ........................................ 192/141,
192/143, 173/156
[51] Int. Cl. ........................................ F16d 71/00
[50] Field of Search .......................... 192/141,
143, 148, 149; 173/156

[56] References Cited
UNITED STATES PATENTS
2,979,965  4/1961  Diebold .................... 192/141 X
3,326,054  6/1967  Canick et al. ............ 192/141 X Primary Examiner—Allan D. Herrmann
Attorneys—Richard W. Anderson and Robert J. Crawford ABSTRACT: A positive mechanical stop for position limits of a lead-screw-driven ram is provided by a ram-motion-actuated stop pawl which is pivoted to engageable relationship with a transverse stop pin carried on the lead screw. By stopping lead screw rotation to effect the ram position limits, high frictional forces between the screw and ram, which might prevent backoff from the limit positions, are avoided.

PATENTED JUL 20 1971 3,593,829
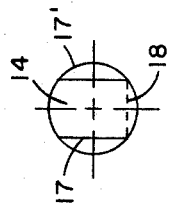
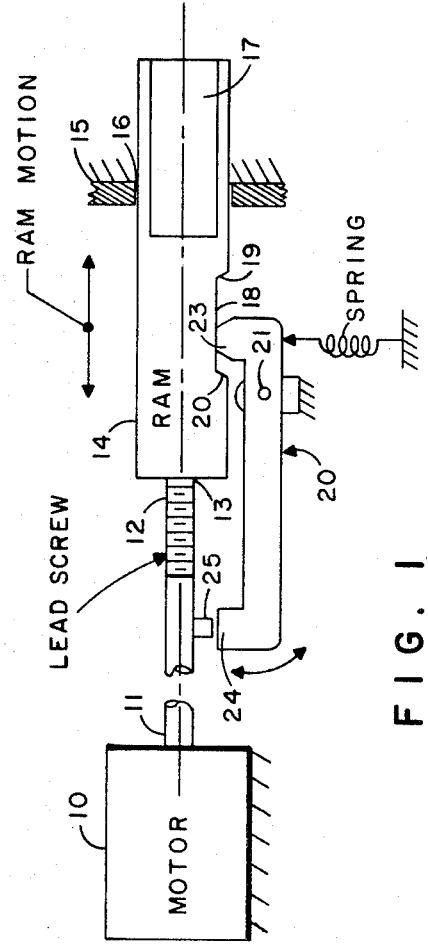
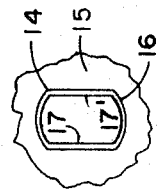
INVENTOR.
WINSTON F. WILLIAMS
BY R.W. Anderson
AGENT

MECHANICAL STOP LIMIT MEANS FOR LEAD SCREW-DRIVEN RAM

This invention relates generally to mechanical stop mechanisms and more particularly to mechanical stop limit means for a lead-screw-driven ram member. The lead-screw-driven ram might be employed, for example, as a servo-driven linear actuator in an aircraft control system when the ram motion is utilized either directly, or as a controlling input to a hydraulic valve system, to impart commanded motions to various aircraft control surfaces. For example, an aircraft control system might incorporate a linear actuator mechanism in a yaw-damping servo.

In these and other types of applications there may exist desirable if not imperative provisions that the linear motion through which the ram is capable of being positioned be precisely limited.

Such limitation is necessary to assure that precise control limits are not exceeded between first and second extremes, to prevent the lead screw drive mechanism per se from exceeding its design limit by bottoming out of the lead screw or exceeding other mechanical limitations, thereby introducing unduly high frictional forces from which there is no recovery.

One type of linear actuator mechanism comprises a lead screw drive in conjunction with a rotation-restrained ram member. A torque motor drives the lead screw to position the ram in accordance therewith. The torque motor operates rapidly in a "tight" servosystem and might be incapable of backing off from a mechanical limitation on ram motion which introduces jamming frictional forces as by the lead screw bottoming out. In such instances, while a mechanical "limit" would be experienced, the servosystem would be rendered incapable of backing off from the limit due to the inability of the drive unit to overcome the frictional force introduced by the mechanical limitation.

The object of the present invention is accordingly the provision of means for imparting a positive mechanical stop to the rotation of the lead screw per se in a lead-screw-driven linear drive mechanism, the incorporation of which does not introduce undue frictional forces from which recovery is impossible.

The present invention is featured in the provision of a cam-operated stop pawl member operating in conjunction with a lead-screw-carried stop pin. The pawl member is motivated by camming means attached to, or designed as an integral part of, the positionable ram member. The stop pawl is selectively positionable into mechanically engageable relationship with respect to the lead screw stop pin as predetermined first and second position limits of ram motion are experienced.

These and other features and objects of the present invention will become apparent upon reading the following description with reference to the accompanying drawings in which:

FIG. 1 is a diagrammatic representation of a mechanical stop limit means for a lead-screw-driven ram member in accordance with the present invention;

FIG. 2 is a cross-sectional detail of the ram member of FIG. 1; and

FIG. 3 is an end view of the ram member showing its relationship with the fixed frame to which the mechanism of the invention would be mounted.

The mechanical stop limit means of the present invention might be utilized in conjunction with well-known limit switches which would interrupt the power source to the drive motor of the mechanism when first and second extremes of ram motion were reached. A mechanism of this type is defined and claimed in my copending application, Ser. No. 33,019, filed Apr. 29, 1970 entitled "Mechanical Adjustment Means For Electrical Limit Switches," assigned to the assignor of the present invention.

In a given system, a linear drive mechanism with mechanical stop limit means of the present invention, when incorporated with limit switch means, would provide a three-part or triple redundancy limit means for the mechanism. Electric limit switches for interrupting motor power and thus causing the mechanism to cease operation would provide the first order of limiting. Should the limit switch means fail for any reason the mechanical stop limit means of the present invention would provide a positive mechanical backup means for assuring that limits were not exceeded. Should the mechanical stop limits of the present invention exhibit a failure, the design of the lead-screw-driven ram per se would provide a third level "brute force" stop wherein either the lead screw would bottom out in the ram or the ram be jammed in the guide means by means of which the ram is constrained from rotation when drive is imparted to the lead screw.

The mechanical stop limit means of the present invention is accordingly illustrated in FIG. 1 as comprising a motor or other prime mover 10 the shaft 11 of which either drives, or is formed as an integral part of, a lead screw member 12. The ram member 14 is formed with a blind hole (not illustrated) into which the lead screw member 12 is threadedly received. The ram 14 as depicted in FIG. 2 is of cylindrical cross section and has a portion thereof formed with flatted sides 17 and 17'. As depicted in FIG. 3, the flatted side end portion of the ram 14 is slidably received in a double-dee opening 16 formed in a fixed bracket member 15. With this configuration rotation of the lead screw 12 by the control of motor 10 causes the ram to translate axially with respect to the lead screw member 12 at a rate determined by the pitch of the lead screw 12 since the ram 14 is constrained from rotation with respect to the lead screw 12 by means of the double-dee shaft and cooperating through hole 16 in bracket 15.

With the mechanism thus far described, and considering that the threaded hole in ram 14 in which the lead screw 12 is received is blind hole, it is seen that a first brute force mechanical limit of ram motion is inherently defined by the lead screw 12 either bottoming out in the blind hole 13 in ram 14 or "running out of threads" such that the unthreaded portion of the motor shaft 11 binds against the ram 14. A second "brute force" mechanical limit is inherently defined when the ram is positioned to the right as depicted in FIG. 1 beyond the flatted side portion of the ram 14 such that the ram jams in the double-dee hole 16 formed in the bracket 15. Either of these mechanical limits, of course, would not be operationally effected in a linear drive mechanism since the motor 10 employed might be incapable of developing sufficient torque to overcome the extreme frictional forces involved when the "brute force" limits are experienced and the mechanism would be incapable of recovering (backing off) from either of the "brute force" mechanical limits.

In accordance with the present invention, therefore, the ram is formed with a flatted or cutout section 18 extending axially along the ram. The flatted portion 18 is terminated in first and second inclined plane surfaces 19 and 20. A pawl member 20, pivotably rotatable about a pivot shaft 21, has a first cam follower end 23 loaded into engagement with the flatted portion 18 on the ram by means of compression spring 22. The other end of the pawl 20 is formed with a termination 24 directed inwardly towards the axis of the motor shaft. As depicted in FIG. 1, the end portion 24 of the pawl 20 is normally clear of a transversely extending locking pin 25 affixed to the motor shaft 11. A mechanical limit as concerns ram motion either left or right is provided by the camming relationship between the follower end 23 of pawl 20 and either of inclined plane camming surfaces 19 and 20 formed into the ram 14. When either of the mechanical limits of ram 14 is experienced, camming motion between either inclined plane 19 or 20 on ram 14 causes pawl 20 to pivot clockwise about its shaft 21 so as to direct the end 24 of pawl 20 into engageable relationship with the transverse locking pin member 25 on motor shaft 11.

The pitch of the lead screw 12, the pitch of the inclined plane camming surfaces 19 and 20 on ram 14, the lever arms of the stop pawl with respect to the cam engagement points and the point of engagement with locking pin 25 may be designed for a particular application such that stop action is "made" or broken during less than one revolution of the lead screw 12.

The stop means of the present invention is thus seen to provide a positive mechanical stop at each of the limits of ram motion by mechanically stopping lead screw rotation rather than by stopping ram motion per se. Were a means employed to mechanically stop the translation of the ram, the motor impetus would continue to drive the lead screw and introduce a jamming motion as to the threaded engagement between the lead screw and the ram. This jamming motion would introduce a frictional force for which the motor 10 might be incapable of overcoming and backing off from such a mechanical limit. It is noted that the mechanical stop of the present invention permits normal rotation and operable engagement between the lead screw member and the ram member until the mechanical limit is reached at which time further lead screw rotation is prevented which in turn ceases ram motion. By the introduction of a stop limit means in accordance with the present invention no undue frictional forces are imparted as to the threaded engagement of the lead screw with the ram member and the device may easily back off from the mechanical limit.

Although the present invention has been defined with respect to a particular embodiment thereof, it is not to be so limited that changes might be made therein which fall within the scope of the invention as defined in the appended claims.

I claim:

1. Mechanical stop means for a lead-screw-driven ram member, said lead screw being rotatable by motor drive means, said ram member being in threaded engagement with said lead screw member and constrained from rotation with respect to said lead screw member, stop pin means affixed to said lead screw member and extending transversely from the rotational axis thereof, pivotable stop pawl means, a first portion of said pawl means being positionable into an engageable position with said stop pin means with said pawl in a first position, a second portion of said pawl comprising cam-following surfaces, said ram member having formed thereon a camming surface comprising an intermediate surface parallel to the rotational axis of said ram and first and second terminating camming surfaces for cooperative engagement with said cam-following surfaces on said pawl, spring means urging the cam-following surfaces of said pawl member into engagement with the camming surfaces on said ram member, whereby a predetermined displacement of said ram member is permitted between first and second position limits defined by the respective engagements of said pawl cam follower surfaces with a cooperating one of said camming surface terminations on said ram member which camming engagements effect a pivot of said pawl member into engageable relationship with said lead screw stop pin means.

2. Mechanical stop limit means for a lead-screw-driven ram member, said ram member being constrained from rotation with respect to said lead screw member, said lead screw member when rotated imparting an axial translation of said ram member, stop pin means extending transversely from said lead screw member, stopping pawl means having a first portion thereof selectively positionable into engageable orientation with respect to said stop pin means, said ram member carrying thereon a camming surface in camming engagement with said stop pawl means, said cam being fashioned to pivot said pawl for selectable engagement with said stop pin means as said ram member translates to either one of first and second limit positions.

3. Stop means as defined in claim 2 wherein said camming means is adapted to effect a pivot at said pawl means for stopping engagement with said stop pin in less than one revolution of said lead screw member with respect to said ram member.

4. Stop means as defined in claim 3 wherein said cam means comprises a flatted section of said ram member terminated in first and second inclined plane surfaces, said pawl means comprising an end member formed with first and second cooperating inclined surface cam-following means, and means for spring biasing said pawl end member with respect to said cam surface.

5. Stop means as defined in claim 1 wherein said camming means is adapted to effect a pivot at said pawl means for stopping engagement with said stop pin in less than one revolution of said lead screw member with respect to said ram member.